United States Patent
Takakuwa et al.

(10) Patent No.: US 9,124,499 B2
(45) Date of Patent: Sep. 1, 2015

(54) FRAME TRANSMISSION SYSTEM

(71) Applicants: Fujitsu Telecom Networks Limited, Kawasaki-shi, Kanagawa (JP); Fujitsu Limited, Kawasaki-shi, Kanagawa (JP)

(72) Inventors: Makoto Takakuwa, Kawasaki (JP); Yasushi Nishine, Kawasaki (JP); Fumihiko Saito, Kawasaki (JP); Takashi Fukagawa, Kawasaki (JP); Mika Tokunaga, Kawasaki (JP); Toshihiro Koji, Osaka (JP); Tamotsu Matsuo, Osaka (JP); Takashi Monzawa, Osaka (JP); Liu Wang, Osaka (JP)

(73) Assignees: FUJITSU TELECOM NETWORKS LIMITED, Kawasaki-Shi, Kanagawa (JP); Fujitsu Limited, Kawasaki-shi, Kanagawa (JP)

( * ) Notice: Subject to any disclaimer, the term of this patent is extended or adjusted under 35 U.S.C. 154(b) by 52 days.

(21) Appl. No.: 13/747,382

(22) Filed: Jan. 22, 2013

(65) Prior Publication Data
US 2013/0188654 A1    Jul. 25, 2013

(30) Foreign Application Priority Data
Jan. 23, 2012    (JP) ................ 2012-011194

(51) Int. Cl.
*H04L 12/24* (2006.01)
*H04L 1/00* (2006.01)
*H04L 12/805* (2013.01)

(52) U.S. Cl.
CPC .......... *H04L 41/0896* (2013.01); *H04L 1/0007* (2013.01); *H04L 47/36* (2013.01)

(58) Field of Classification Search
None
See application file for complete search history.

(56) References Cited

U.S. PATENT DOCUMENTS 5,956,344 A * 9/1999 Cole .............................. 370/465
6,819,658 B1 * 11/2004 Agarwal et al. ................ 370/316

(Continued)

FOREIGN PATENT DOCUMENTS

JP    2006-074726 A    3/2006
JP    2007-267051 A    10/2007

(Continued)

OTHER PUBLICATIONS

Combined Search and Examination Report under Sections 17 and 18(3), dated Jul. 8, 2013, for British Patent Application No. GB1301078.0, including the above listed U.S. references cited therein, 5 pages.

(Continued)

*Primary Examiner* — Anh-Vu Ly
*Assistant Examiner* — Hashim Bhatti
(74) *Attorney, Agent, or Firm* — Christie, Parker & Hale, LLP

(57) ABSTRACT

A frame transmission system includes a frame transmitter and a frame receiver. The frame transmitter includes a frame fragmentation unit and a reproduction header appending unit. The frame fragmentation unit fragments an input frame and outputs transfer frames when the length of the input frame exceeds a predetermined fragmentation reference frame length, and does not fragment the input frame and outputs the input frame as a transfer frame when the length of the input frame is less than or equal to the fragmentation reference frame length. The reproduction header appending unit appends a reproduction header to the transfer frames outputted from the frame fragmentation unit. Here, the reproduction header being required when the transfer frames are reproduced at a receiving side. The reproduction header appending unit varies the header length of the reproduction header to be appended to the transfer frame, according to the length of the input frame.

8 Claims, 16 Drawing Sheets

(56) References Cited

U.S. PATENT DOCUMENTS

| | | | |
|---|---|---|---|
| RE39,454 E * | 1/2007 | Cantoni et al. | 370/473 |
| 2008/0037547 A1 * | 2/2008 | Jang | 370/394 |
| 2009/0201948 A1 * | 8/2009 | Patwardhan et al. | 370/474 |
| 2010/0074178 A1 * | 3/2010 | Larmo et al. | 370/328 |
| 2010/0135495 A1 * | 6/2010 | Chion et al. | 380/273 |
| 2010/0322249 A1 * | 12/2010 | Thathapudi et al. | 370/395.1 |
| 2011/0211591 A1 * | 9/2011 | Traub et al. | 370/474 |

FOREIGN PATENT DOCUMENTS

| | | |
|---|---|---|
| JP | 2007-288491 A | 11/2007 |
| JP | 2011-160371 | 8/2011 |

OTHER PUBLICATIONS

Japanese Office action for Patent Application No. 2012-011194, dated Jun. 16, 2015, 6 pages.

\* cited by examiner

FIG.4

| | INPUT FRAME LENGTH (byte) | INPUT FRAME LENGTH EXCLUDING FCS (byte) | FRAGMEN-TATION | OUTLINE OF PROCESSING | |
|---|---|---|---|---|---|
| | | | | 1ST REPRODUCTION HEADER (1 byte) | 2ND REPRODUCTION HEADER (4 BYTES) |
| 1 | 64~FL/2 | 60~(FL/2-4) | NO | × | × |
| 2 | (FL/2+1)~FL | (FL/2-3)~(FL-4) | NO | ○ | × |
| 3 | (FL+1)~9600 | (FL-3)~9596 | YES | × | ○ |

FIG.8

| NAME | BITS | DESCRIPTION | REMARKS |
|---|---|---|---|
| fragment FLAG | 4 | fragment FLAG[3] :<br>  INDICATE WHETHER A FRAME IS FRAGMENTED OR NOT<br><br>  0:NOT FRAGMENTED<br>  1:FRAGMENTED<br><br>fragment FLAG[2] :<br>  Start of Packet<br>  0:NOT THE BEGINNING OF A FRAGMENTED FRAME<br>  1:THE BEGINNING OF A FRAGMENTED FRAME<br><br>fragment FLAG[1] :<br>  Continued of Packet<br>  0:NOT BETWEEN THE BEGINNING AND THE END OF A FRAGMENTED FRAME<br>  1:BETWEEN THE BEGINNING AND THE END OF A FRAGMENTED FRAME<br><br>fragment FLAG[0] :<br>  End of Packet<br>  0:NOT THE END OF FRAGMENTED FRAMES<br>  1:THE END OF FRAGMENTED FRAMES | EACH BIT OF Fragment FLAG[2:0] IS NORMALLY SUCH THAT 1 BIT ONLY IS SET, OTHERWISE ALL ARE 0'S. |

FIG.10

| NAME | BITS | DESCRIPTION | REMARKS |
|---|---|---|---|
| fragment FLAG | 4 | THE SAME AS THE 1ST REPRODUCTION HEADER | |
| ID | 16 | THIS EXPRESSES THE FRAME NUMBER OF A FRAME BEFORE THE FRAGMENTATION<br><br>THIS IS USED TO REDUCE THE ESTABLISHMENT OF FAULTY REASSEMBLY IN THE FRAME REASSEMBLING UNIT (1/65536), WHEN THE CONTINUITY OF TRANSFER FRAMES IS LOST (E.G., SIGNAL INTERRUPT) | |
| fragment Sequence No. | 8 | THIS INDICATES THE NUMBER OF A TRANSFER FRAME AFTER FRAMGMENTATION<br>0 : Reserved<br>1 : THE NUMBER OF Start of Packet<br>2~ : APPENDED ACCORDING TO THE NUMBER OF FRAGMENTS | |

FIG.13

| ITEMS | CONTENT | REMARKS |
|---|---|---|
| 1 | WHEN THOSE OF THE EXPECTED fragment sequence NUMBERS ARRIVED ARE LESS THAN A PREDETERMINED TOTAL NUMBER THEREOF | |
| 2 | THE CASE WHEN FRAMES OF DIFFERENT IDS ARE RECEIVED BEFORE FRAME REASSEMBLY | CONDITION REQUIRED IN THE EVENT THAT THE REARRANGEMENT OF FRAMES IS NOT PERFORMED IN THE REASSEMBLING PROCESSING |
| 3 | THE CASE WHEN THE Start of Packet WHOSE fragment sequence NUMBER IS NOT "1" IS RECEIVED. | |
| 4 | THE CASE WHEN AN UNDEFINED fragment FLAG IS RECEIVED. | |
| 5 | AT THE TIME WHEN A PROCESS OF CLEARING THE REASSEMBLY BUFFER IS OPERATED. | |
| 6 | THE CASE WHERE THE FRAME HAVING AN EXPECTED ID HAS NOT ARRIVED WITHIN A PREDETERMINED TIME PERIOD | |

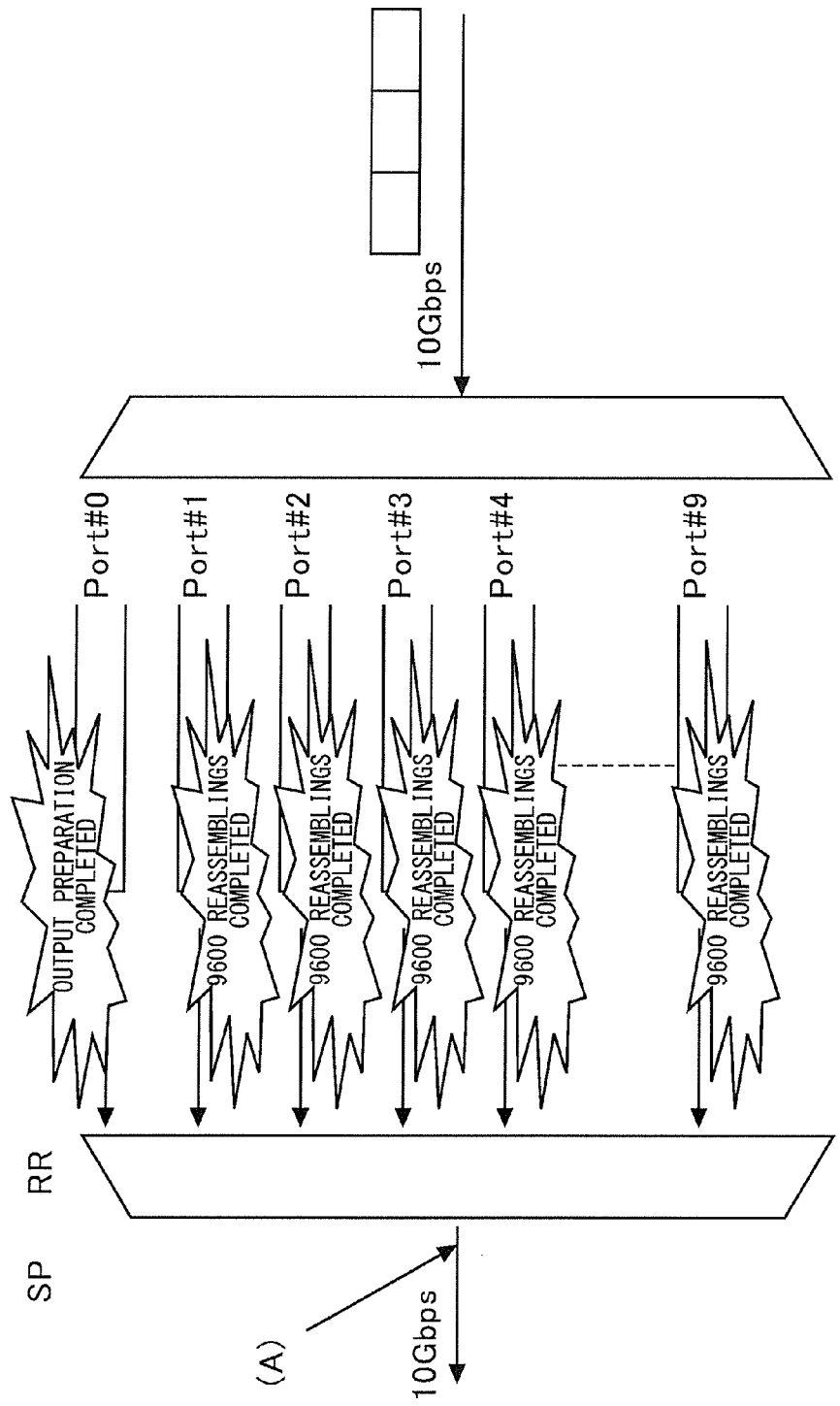

FRAME TRANSMISSION SYSTEM

CROSS-REFERENCE TO RELATED APPLICATION

This application claims priority to and the benefit of Japanese Patent Application Number 2012-011194, filed on Jan. 23, 2012, the entire disclosure of which is incorporated herein by reference.

BACKGROUND OF THE INVENTION

1. Field of the Invention

The present invention relates to a frame transmission system that transmits variable-length frames such as IP frames or Ethernet frames.

2. Description of the Related Art

In recent years, the telecommunications industries are shifting the transmission system from a relatively costly transmission system based on a synchronous digital hierarchy/synchronous optical network (SDH/SONET) technology to a relatively inexpensive one based on an Ethernet (registered trademark) technology. The same can be said for a large-capacity core communication line, which is so-called a backbone line.

RELATED ART LIST (1) Japanese Unexamined Patent Application Publication No. 2011-160371.

The SDH/SONET technology is a technique where data is transmitted and received at fixed intervals using fixed-length frames, so that variation in transmission delay is small. On the other hand, the Ethernet technology is a technique where data is transmitted and received intermittently using variable-length frames, so that the variation in transmission delay tends to be larger than that in the SDH/SONET technology. Suppose that two frames collide in a frame junction such as a switch in the Ethernet technology. Then, while one of the two frames is being read out, the other frame must wait for its turn to be read out. If, for example, the two short frames collide, the transmission delay of the other frame, which is read subsequently, will be comparatively small. However, if a long frame and a short frame collide with each other and the long frame is read first, the transmission delay of the short frame, which must wait for its turn to be read out, will be large. Thus, the Ethernet technology suffers the variation in transmission delay caused by the use of variable-length frames.

Nevertheless, even for a transmission system using the variable-length frames such as Ethernet frames, it is required in recent years that the variation in transmission delay be minimized.

In order to reduce the variation in transmission delay, it is conceivable that a variable-length frame is fragmented into a plurality of fixed-length frames. That is, a long frame is fragmented into short frames for use with data transfer, so that the variation in wait time for a process in the frame junction is reduced and therefore the variation in transmission delay can be suppressed.

In the above method where a frame is fragmented, a plurality of fragmented frames need to be reassembled at a receiving side so as to restore the original frame. Accordingly, a header carrying the information required to restore the original frame (this header will be referred to as "reproduction header" also) is appended to each fragmented frame.

Appending the reproduction header to each fragmented frame necessitates securing an extra band to cover the reproduction header. A rate of bandwidth increase due to the appending of the header is expressed by (frame length+header length)/(frame length). As is obvious from this equation for calculating the rate of bandwidth increase, the shorter the frame length is, the larger the rate of bandwidth increase will become. For example, where the Ethernet frames are used, the rate of bandwidth increase becomes maximum at the minimum frame whose frame length is 64 bytes (e.g., the rate of bandwidth increase being (64+4)/64≈1.06 where the header length is 4 bytes). The bandwidth must be secured in consideration of a case where the maximum number of such minimum frames is inputted, so that the bandwidth utilization efficiency drops.

SUMMARY OF THE INVENTION

The present invention has been made in view of the foregoing circumstances, and a purpose thereof is to provide a technology capable of suppressing the rate of bandwidth increase in a frame transmission system that fragments variable-length frames and transmits the thus fragmented frames.

In order to resolve the above-described problems, a frame transmission system according to one embodiment of the present invention includes: a frame transmitter including: a frame fragmentation unit configured to fragment an input frame so as to output transfer frames when the length of the input frame exceeds a predetermined fragmentation reference frame length and configured not to fragment the input frame so as to output the input frame as a transfer frame when the length of the input frame is less than or equal to the fragmentation reference frame length; and a reproduction header appending unit configured to append a reproduction header to the transfer frame outputted from the frame fragmentation unit, the reproduction header being required when the transfer frames are reproduced at a receiving side; and a frame receiver including a frame reassembling unit for reproducing the original frame from the transfer frames received from the frame transmitter. The reproduction header appending unit varies the header length of the reproduction header to be appended to the transfer frame, according to the length of the input frame.

When the length of the input frame is less than or equal to ½ of the fragmentation reference frame length, the reproduction header appending unit may not append the reproduction header to the transfer frames; when the length of the input frame is greater than ½ of the fragmentation reference frame length and less than or equal to the fragmentation reference frame length, the reproduction header appending unit may append a first reproduction header having a first predetermined header length to the transfer frames; and when the length of the input frame is greater than the fragmentation reference frame length, the reproduction header appending unit may append a second reproduction header having a second predetermined header length, which is longer than the first predetermined header length, to the transfer frames.

When the length of the input frame is greater than the fragmentation reference frame length, the frame fragmentation unit may fragment the input frame in a manner such that the length of the transfer frame becomes greater than ½ of the fragmentation reference frame length.

The frame reassembling unit may identify whether or not the reproduction header is appended to the transfer frame, based on the frame length of the transfer frame received.

The first reproduction frame may include information indicating that the transfer frame is not a fragmented frame, and the second reproduction frame may include information indicating that the transfer frame is a fragmented frame.

The frame reassembling unit may identify that the reproduction header is the first reproduction header or the second reproduction header, based on the information, contained in the reproduction header appended to the received transfer frame, indicating whether the transfer frame is a fragmented frame or not.

The second reproduction header may further contain a frame identification number and a frame sequence number.

When the transfer frames are not completely reproduced, the frame reassembling unit may discard said transfer frames.

The frame reassembling unit may include a buffer used for a frame reassembling process, and the buffer may be configured to set an output priority after the frame reassembling process has been completed.

Optional combinations of the aforementioned constituting elements, and implementations of the invention in the form of apparatuses, methods, systems, programs, recording media storing the programs and so forth may also be practiced as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 4 shows a list of frame fragmentation processes according to the length of input frames;

FIG. 8 is a diagram for explaining a format of first reproduction header;

FIG. 10 is a diagram for explaining a format of second reproduction header;

FIG. 13 shows a list of conditions under which a frame is discarded in a frame reassembling process;

FIG. 16 is a diagram for explaining problems caused when no output priority is given after reassembly.

DETAILED DESCRIPTION OF THE INVENTION

The invention will now be described by reference to the preferred embodiments. This does not intend to limit the scope of the present invention, but to exemplify the invention.

Hereinbelow, frame transmission systems according to preferred embodiments of the present invention are explained referring to drawings.

Figure 1:
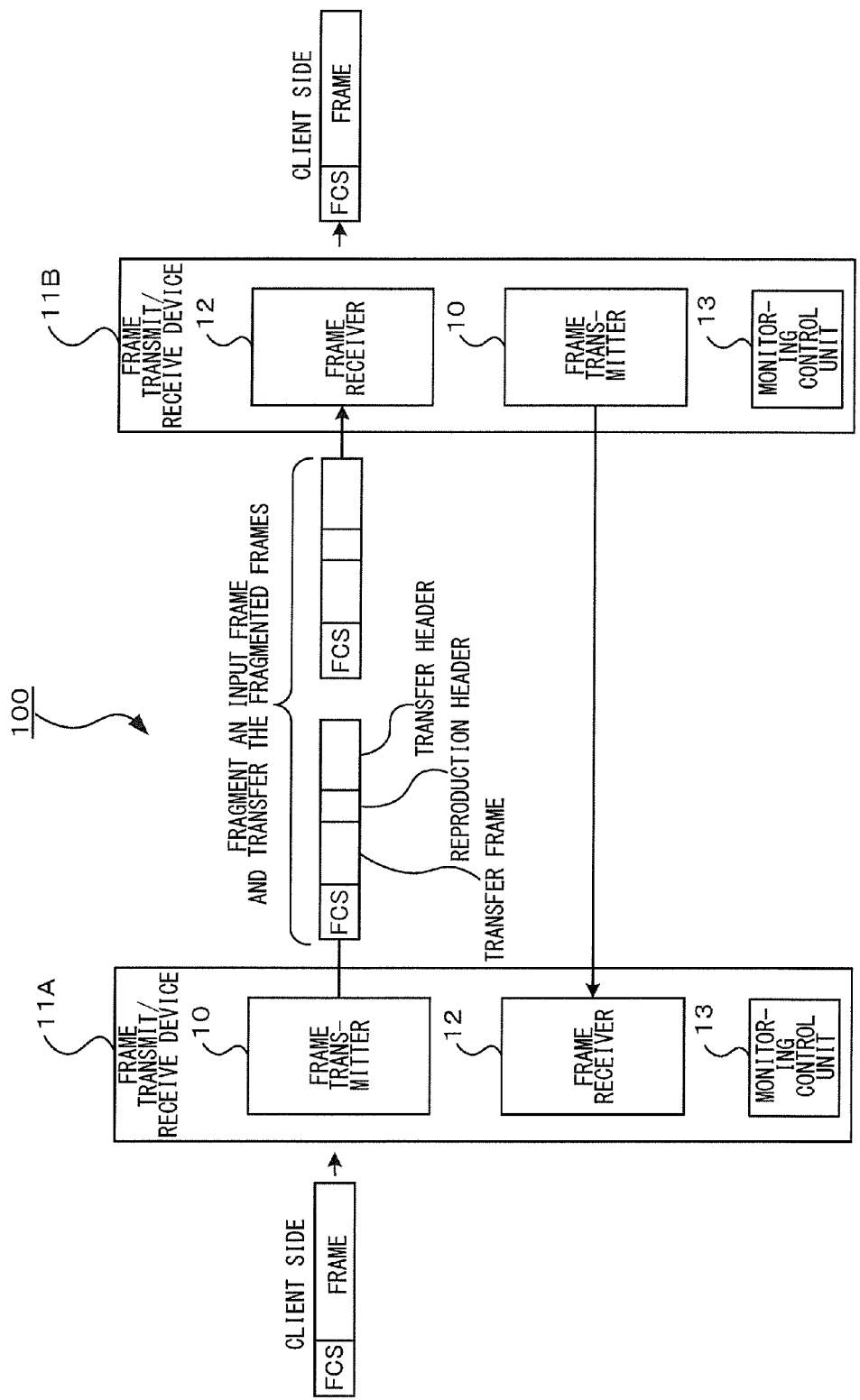
FIG. 1 shows a frame transmission system according to an embodiment of the present invention.

FIG. 1 shows a frame transmission system 100 according to an embodiment of the present invention. The frame transmission system 100 shown in FIG. 1 is a transmission system that transmits and receives Ethernet frames. As illustrated in FIG. 1, the frame transmission system 100 includes a frame transmit/receive device 11A and a frame transmit/receive device 11B.

The frame transmit/receive devices 11A and 11B each includes a frame transmitter 10, a frame receiver 12, and a monitoring control unit 13. The frame transmission system 100 is capable of performing two-way frame transmission. That is, the frame transmission system 100 can transmit frames from the frame transmitter 10 of the frame transmit/receive device 11A to the frame receiver 12 of the frame transmit/receive device 11B and can also transmit frames from the frame transmitter 10 of the frame transmit/receive device 11B to the frame receiver 12 of the frame transmit/receive device 11A. The monitoring control unit 13, which is comprised of a CPU, a ROM, a RAM, a communication interface and so forth, monitors and controls the components inside the frame transmit/receive device 11 and communicates with other devices.

Frames are inputted to the frame transmitter 10 from a client. Since these frames are Ethernet frames, each Ethernet frame has the frame length of 64 to 9600 bytes. Following an inputted frame, a frame check sequence (FCS) for use in detecting error is appended. It is assumed in the present embodiment that FCS is 4 byte long.

The frame transmitter 10 fragments an input frame fed from the client into a plurality of fragmented frames, which are used to transfer each input frame (these fragmented frames will be referred to as "transfer frames" also), and then transfers the thus fragmented frames to the frame receiver 12.

A transfer header carrying the information about a transfer destination and a reproduction header carrying the information required when a fragmented frame is reassembled and reproduced at the frame receiver 12 are appended to each transfer frame. Where the frames are Ethernet frames, the transfer header carries the information such as a destination address (DA), a source address (SA) and the type.

The transfer frame transmitted from the frame transmitter 10 is received by the frame receiver 12. The transfer frame may pass through a not-shown relay device while it is transmitted from the frame transmitter 10 up to the frame receiver 12.

The frame receiver 12 reassembles and reproduces a plurality of fragmented frames received thereby into an original frame and then outputs the original frame to the client.

Figure 2:
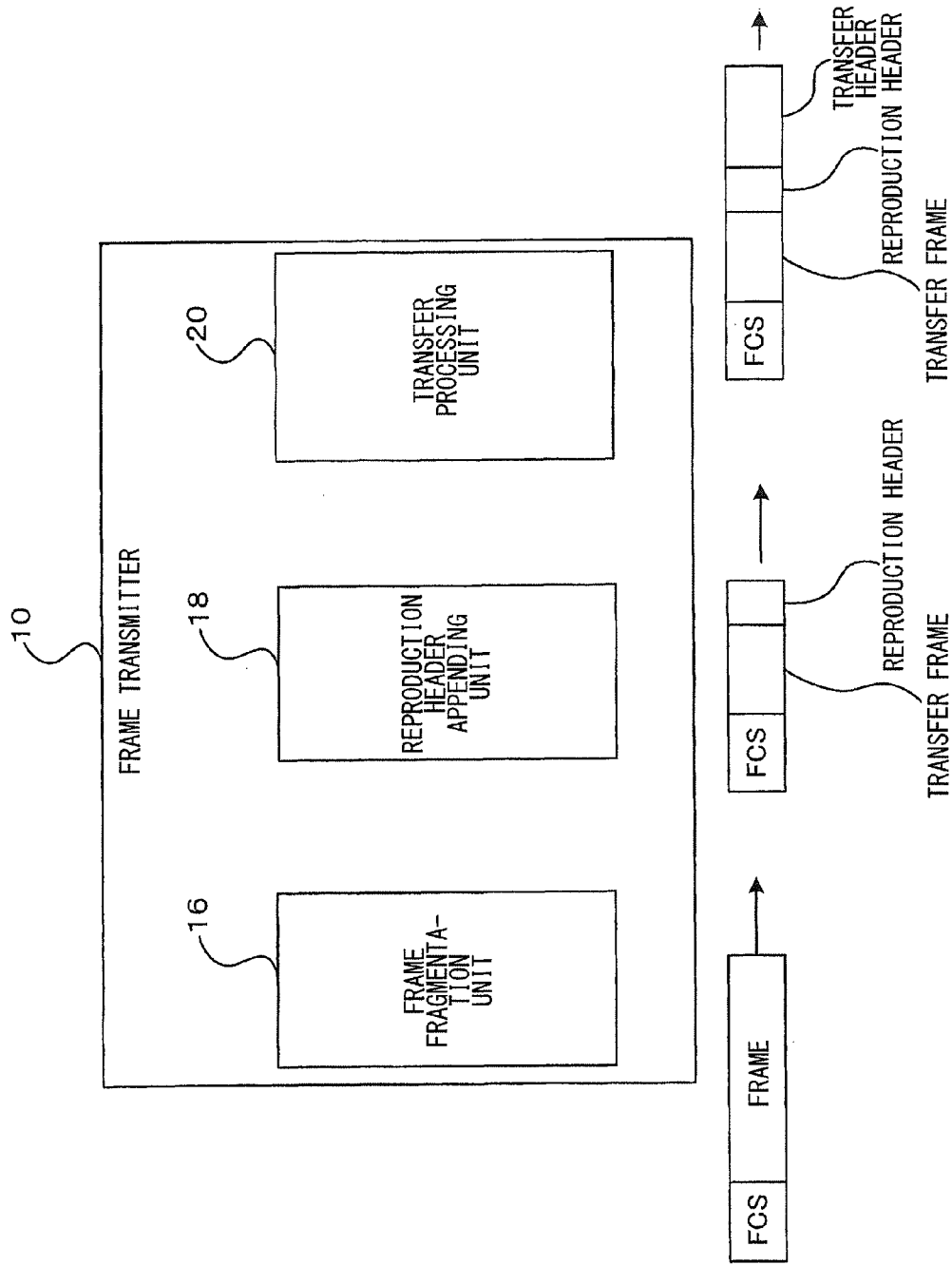
FIG. 2 shows a structure of a frame transmitter.

FIG. 2 shows a structure of the frame transmitter 10. As shown in FIG. 2, the frame transmitter 10 includes a frame fragmentation unit 16, a reproduction header appending unit 18, and a transfer processing unit 20.

The frame fragmentation unit 16 receives frames from the client and generates transfer frames. The frame fragmentation unit 16 fragments an input frame according to the length of the input frame (frame length) inputted from the client. More specifically, if the input frame is greater than a predetermined fragmentation reference frame length FL, the frame fragmentation unit 16 will fragment the input frame so as to generate a plurality of transfer frames. If, on the other hand, the frame length is less than or equal to the fragmentation reference frame length FL, the frame fragmentation unit 16 will not fragment this input frame and then output it as a transfer frame.

Since the input frame is an Ethernet frame in the present embodiment, the length of a frame ranges from 64 to 9600 bytes. Thus, the frame fragmentation unit 16 does not fragment the input frame, whose length ranges from 64 to FL bytes, and then outputs it as it is, and fragments the input frame, whose length ranges from (FL+1) to 9600 bytes, and then outputs the fragmented frames.

The reproduction header appending unit 18 appends a reproduction header to the transfer frame outputted from the frame fragmentation unit 16. Though its detail will be discussed later, the reproduction header varies the header length of the reproduction header to be appended to the transfer frame, according to the length of the input frame inputted to the frame fragmentation unit 16.

The transfer processing unit 20 appends a transfer header to a transfer frame outputted from the reproduction header appending unit 18 and then transmits the transfer frame to the frame receiver 12.

Figure 3:
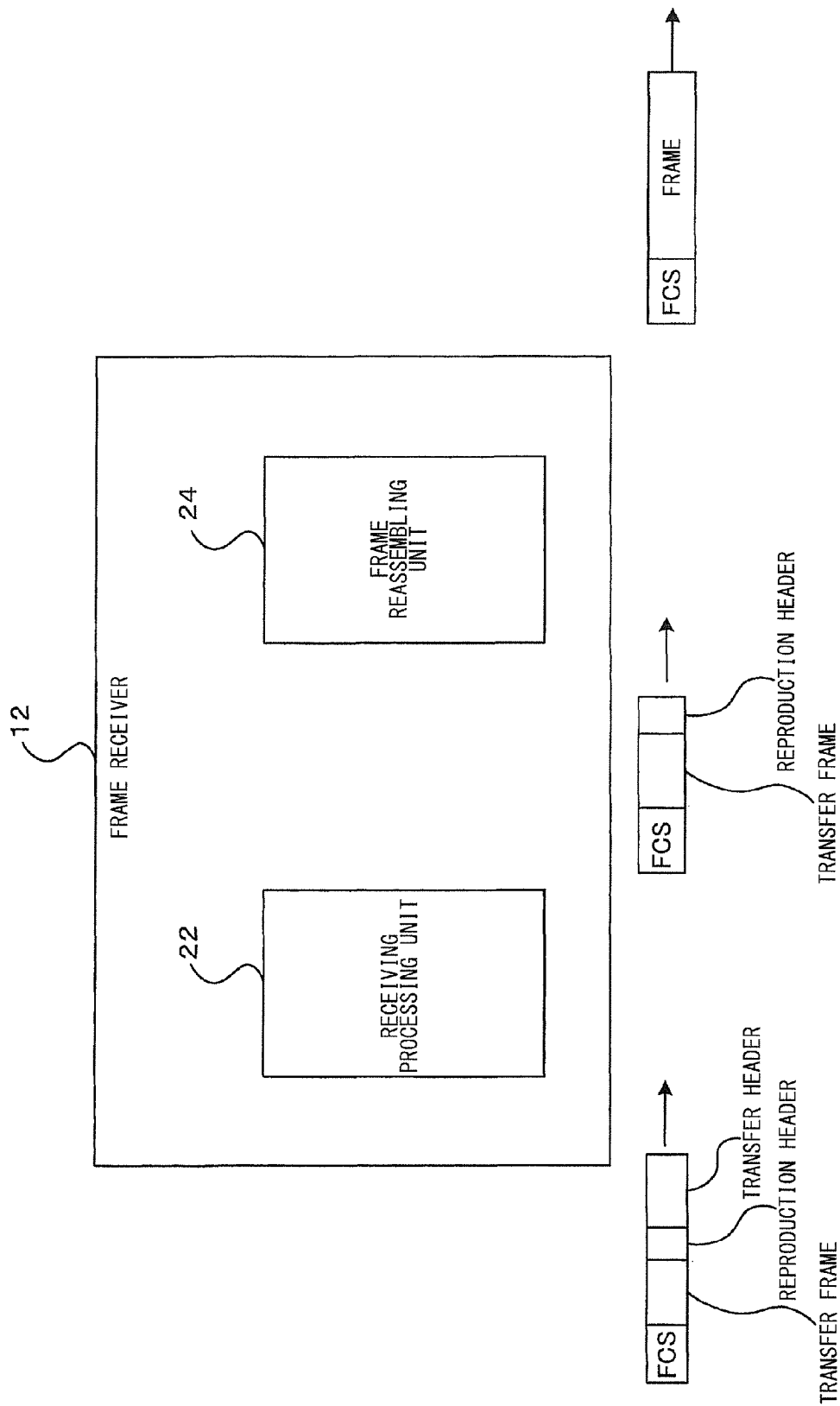
FIG. 3 shows a structure of the frame receiver.

FIG. 3 shows a structure of the frame receiver 12. As shown in FIG. 3, the frame receiver 12 includes a receiving processing unit 22 and a frame reassembling unit 26.

The receiving processing unit 22 receives the transfer frames from the frame transmitter 10. The receiving processing unit 22 removes the transfer head from the transfer frame and then outputs the transfer frame without the transfer header appended thereto to the frame reassembling unit 24.

The frame reassembling unit 24 restores and reproduces the original frame from the transfer frames inputted from the receiving processing unit 22.

Figure 5A:
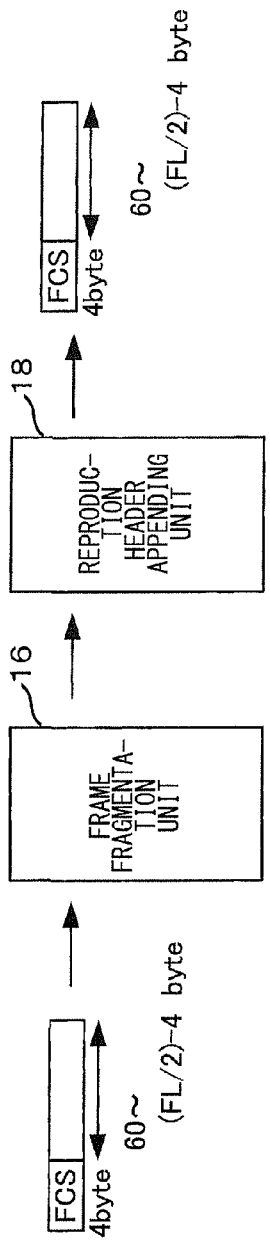
FIGS. 5A to 5C are diagrams for explaining the frame fragmentation processes according to the length of input frames.
Figure 5B:
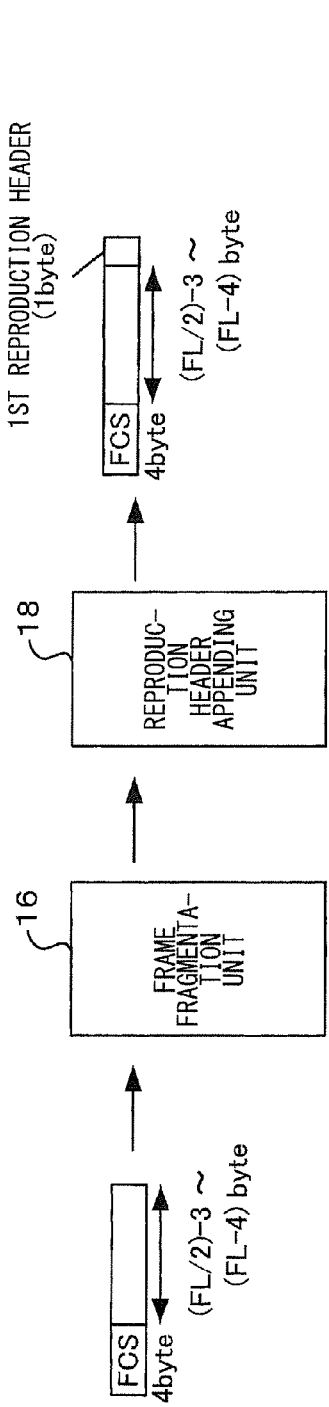
Figure 5C:
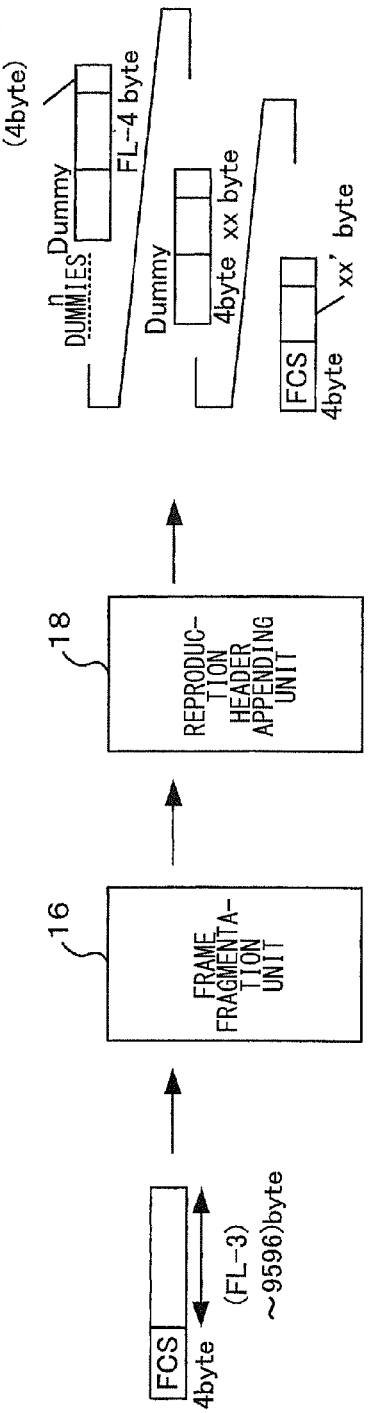

FIG. 4 shows a list of frame fragmentation processes according to the length of input frames. FIGS. 5A to 5C are diagrams for explaining the frame fragmentation processes according to the length of input frames.

In the present embodiment, the frame fragmentation process differs depending on the length of each input frame (input frame length) inputted to the frame fragmentation unit 16. A description is given hereunder of frame fragmentation processes (1) to (3) for the respectively different input frame lengths.

(1) For the case where the input frame length ranges in 64 bytes (inclusive) to FL/2 (inclusive) (60 to (FL/2-4) bytes if FCS is excluded):

In the case (1), the frame fragmentation unit 16 does not fragment the input frame and then outputs it directly as a transfer frame. The reproduction header appending unit 18 outputs the transfer frame without appending the reproduction header thereto.

(2) For the case where the input frame length is greater than FL/2 bytes and less than or equal to FL bytes ((FL/2-3) to (FL-4) bytes if FCS is excluded):

In the case (2), the frame fragmentation unit 16 does not fragment the input frame and then outputs directly it as a transfer frame. The reproduction header appending unit 18 appends a first reproduction header, having a first header length, to the transfer frame.

(3) For the case where the input frame length is greater than FL bytes and less than or equal to 9600 bytes ((FL-3) to 9596 bytes if FCS is excluded):

In the case (3), the frame fragmentation unit 16 fragments an input frame and then outputs a plurality of transfer frames. The reproduction header appending unit 18 appends a second reproduction header, having a second header length, to each transfer frame. Note that the second header length is longer than the first header length. Assume in the present embodiment that the second header is 4 byte long. Note also that "dummy" is appended to the end of each fragmented frame except for the last transfer frame. The frame transmission system 100 according to the present embodiment is a system that handles an processes Ethernet frames, and FCS is appended to each transfer frame. The "dummy" is appended for the purpose of ensuring the area to be occupied by FCS later. The "dummy" will be converted to FCS by the transfer processing unit 20 disposed at a subsequent stage.

As described above, the reproduction header appending unit 18 varies the header length of a reproduction header to be appended to a transfer frame, according to the length of an input frame inputted to the frame fragmentation unit 16. If no reproduction header is appended, this can be thought of as the header length being equal to 0 byte. In this manner, the length of the reproduction header is varied as appropriate, so that the rate of bandwidth increase can be significantly reduced as compared with the cases where the reproduction header appending unit 18 appends the reproduction headers to the transfer frames regardless of whether the fragmentation process is involved or not.

Figure 6:
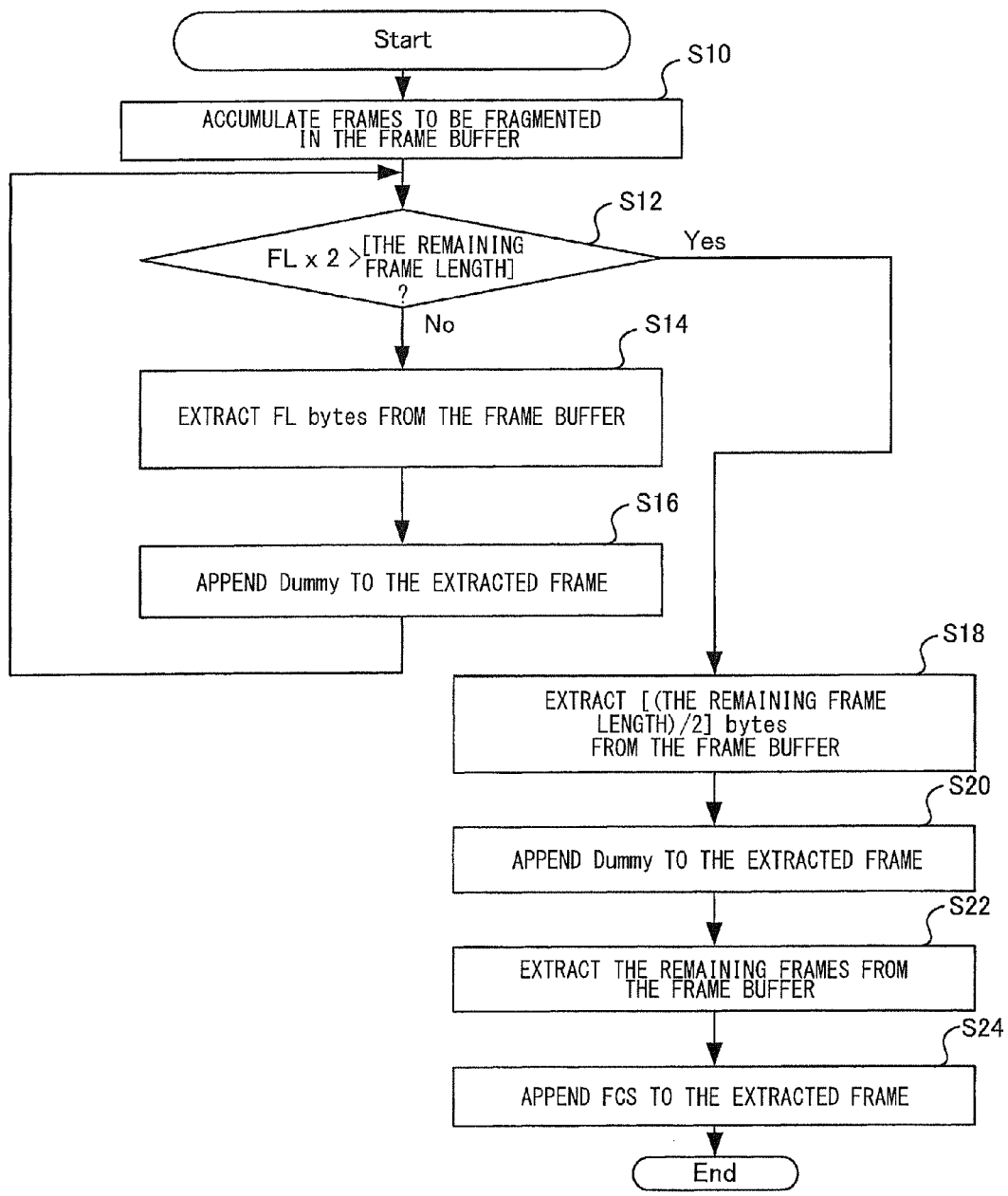
FIG. 6 is a flowchart showing a frame fragmentation process.

FIG. 6 is a flowchart showing a frame fragmentation process. If the length of an input frame inputted to the frame fragmentation unit 16 exceeds the fragmentation reference frame length FL, the frame fragmentation process shown in the flowchart of FIG. 6 will be performed.

Firstly, the frame fragmentation unit 16 stores input frames, which are to be fragmented, in a frame buffer (S10). The frame buffer may be of a store-and-forward switching method or cut-through switching method. Or the frame buffer may be of a type where although the processing starts after the entire frames have been buffered, a certain delay is given regardless of the byte length of frames.

Where the buffer implementing the store-and-forward switching method is used, a buffer size is selectable efficiently. That is, the buffer size is smaller for a shorter frame, whereas a larger buffer is used for a longer frame. In this manner, the store-and-forward type buffer is advantageous in that the information concerning the frame end can also be referenced.

Where the cut-through type buffer is used, it is only necessary that the buffer size is equal to that corresponding to the reproduction headers only. Further, the cut-through type buffer is advantageous in that the delay is suppressed to the minimum and the delay variation does not occur.

The frame buffer of a type where the processing starts after the entire frames have been buffered but a certain delay is given regardless of the byte length of frames is used to suppress the delay variation in the store-and-forward switching. This type of buffer is advantageous in that the delay variation is suppressed.

Then the frame fragmentation unit 16 determines if the length of frames remaining in the frame buffer (hereinafter referred to as "remaining frame length" also) is less than twice the fragmentation reference frame length FL (S12). If the remaining frame length is greater than or equal to FL×2 (No of S12), the frame fragmentation unit 16 will extract FL bytes from the frame buffer (S14) and append "Dummy" to the extracted FL-byte frame (S16). As already mentioned, the "dummy" is appended in order to ensure the area to be occupied by FCS later. The dummy is not necessarily appended at the stage of Step S16 as shown in FIG. 6 but may be appended in a process subsequent to Step S16.

Then the procedure returns to Step S12, and Steps S12 to S16 are repeated. If, in Step S12, the remaining frame becomes smaller than FL×2 (Yes of S12), the frame fragmentation unit 16 will extract [the remaining frame length]/2 bytes from the frame buffer (S18) and append "Dummy" to the extracted frame (S20). If the frame length is not divisible by 2, the decimal places will be rounded up.

Then the frame fragmentation unit 16 extracts the remaining frame from the frame buffer (S22). At this time, the frame remaining in the frame buffer is 0 byte long. The frame fragmentation unit 16 appends FCS to the extracted frame so as to be outputted. The FCS appended this time may be the same FCS as that appended in the first place.

In Step S12 of the flowchart shown in FIG. 6, it is determined whether or not the remaining frame length is smaller than twice the fragmentation reference frame length FL, and the remaining frame will be fragmented into half if the remaining frame length is smaller than FL×2. By performing such a frame fragmentation process, the input frames are fragmented so that each length of all transfer frames is greater than ½ of the fragmentation reference frame length FL. As a result, each transfer frame can be converted to a frame, suited to an Ethernet format, whose length is greater than and equal to 64 bytes. Also, as will be discussed later, the frame receiver 12 according to the present embodiment determines whether the transfer frame is fragmented or not, based on the length of the transfer frame. The length of the fragmented transfer frame is reliably made greater than FL/2, so that whether or not the transfer frame is fragmented can be suitably determined by the frame receiver 12.

Figure 7:
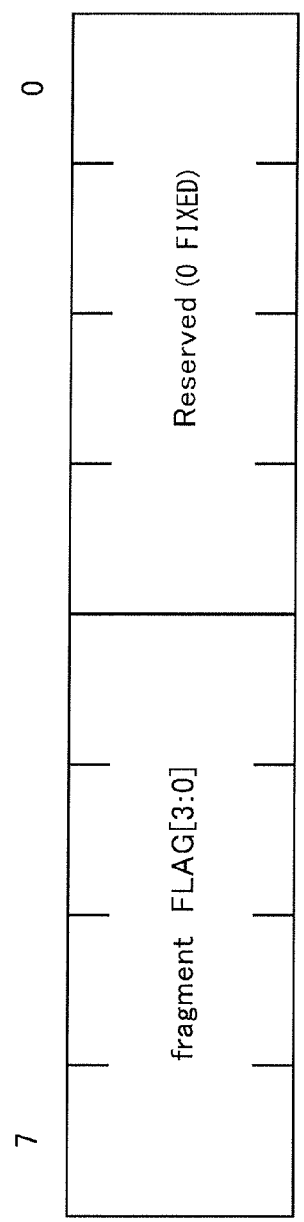
FIG. 7 is a diagram for explaining a format of first reproduction header.

FIG. 7 is a diagram for explaining a format of first reproduction header. As shown in FIG. 7, the length of the first reproduction header (first header length) is 1 byte. 4 bits in this 1 byte are used as a fragment FLAG and the rest of 4 bits are used as "reserved".

FIG. 8 is a diagram for explaining a format of first reproduction header. As shown in FIG. 8, of 4-bit fragment FLAG, fragment FLAG[3] indicates whether a frame is fragmented or not. If fragment FLAG[3] is "0", this will indicate that the frame is not fragmented. If fragment FLAG[3] is "1", this will indicate that the frame is fragmented.

Also, fragment FLAG[2:0] indicates where a frame after fragmentation is located. Although, in the actual setting, the fragment FLAG in the first reproduction header can only be a flag indicating the beginning of a frame, such a format as fragment FLAG[2:0] is used because the format is shared with the 4 bytes second reproduction header.

Figure 9:
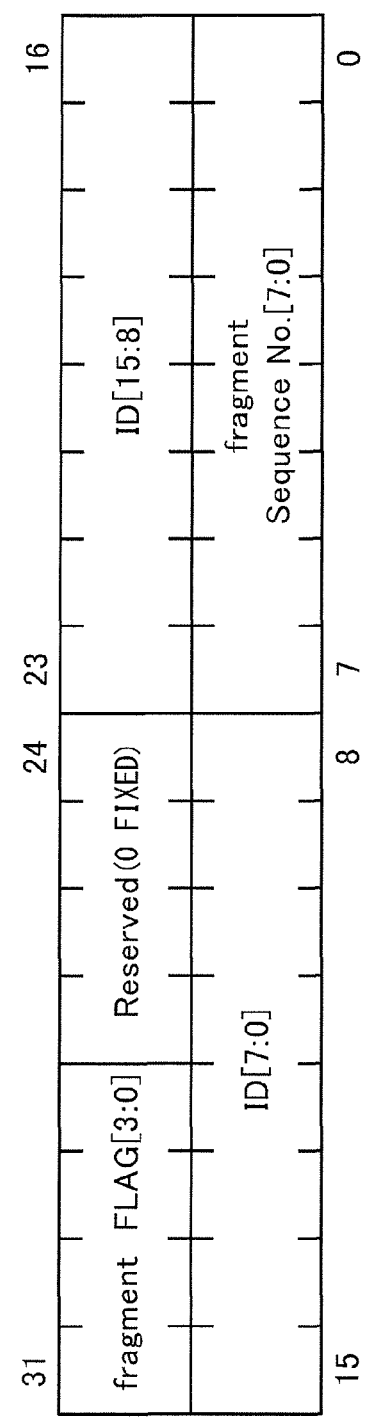
FIG. 9 is a diagram for explaining a format of second reproduction header.

FIG. 9 is a diagram for explaining a format of second reproduction header. As shown in FIG. 9, the length of the second reproduction header (second header length) is 4 bytes. In addition to the fragment FLAG similar to that of the first reproduction header, the second reproduction header has regions for an ID and a fragment sequence number.

FIG. 10 is a diagram for explaining a format of second reproduction header. The ID is an identification number indicating the frame number of a frame before fragmentation. Appending the IDs can reduce the probability that frames will be erroneously reassembled in a frame reassembling process. In this frame reassembly processing, only transfer frames having the same IDs are reassembled. The larger the number of bits is for an ID, faulty reassembly can be further reduced.

The fragment sequence numbers are information indicating that a frame associated with a given fragment sequence number belongs to which one of a plurality of transfer frames fragmented from an original frame. Having the fragment sequence numbers allows the transfer frames to be reassembled in the correct order even if the order of the transfer frames is reversed while the transfer frames pass through a communication path. Note that the fragment sequence numbers may be used to detect the frame reassembly error where frames are not reassembled in the correct sequence.

Figure 11A:
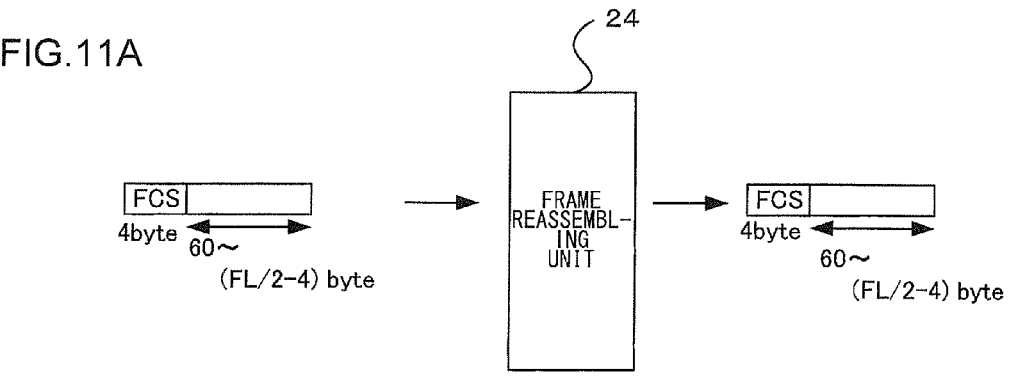
FIGS. 11A and 11B are each a flowchart showing a frame reassembling process in a frame receiver.
Figure 11B:
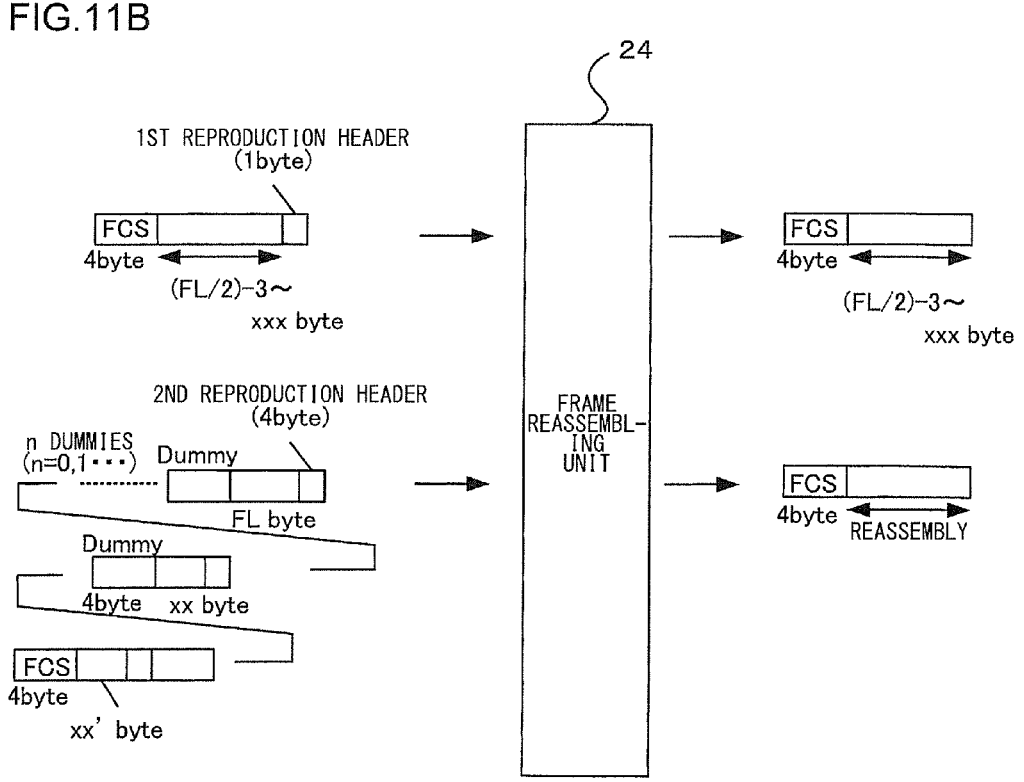
Figure 12:
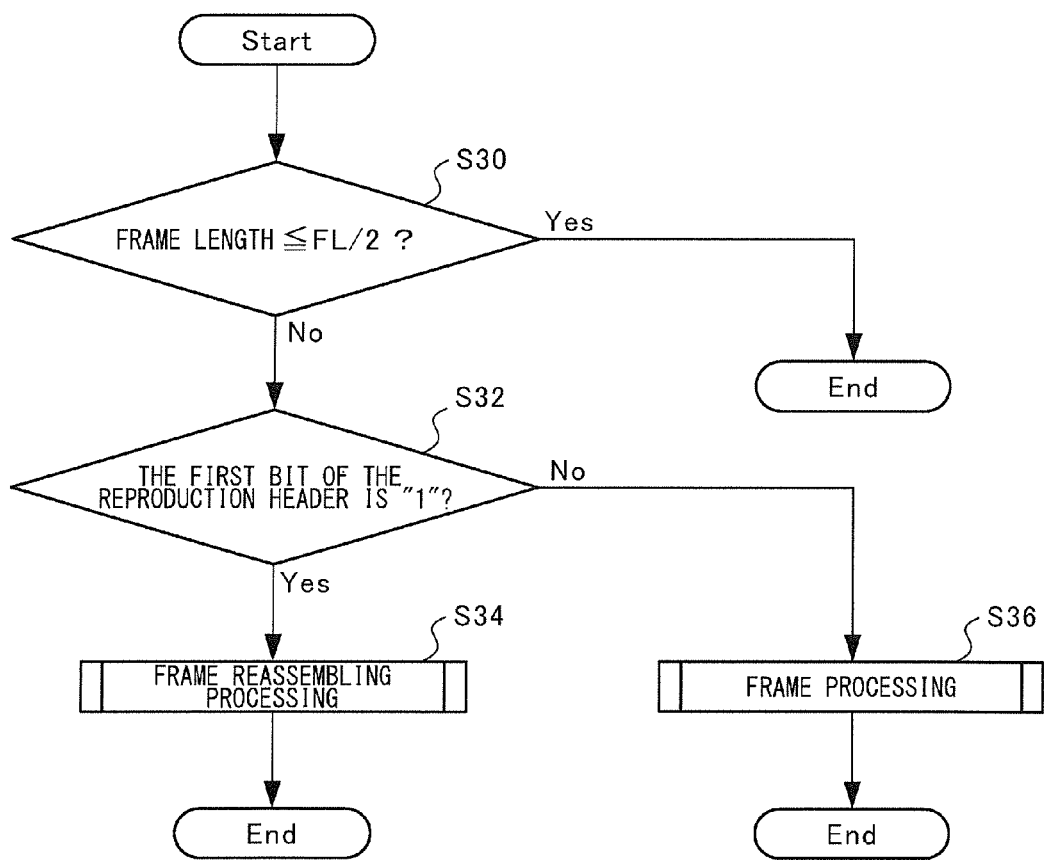
FIG. 12 is a flowchart showing a frame reassembling process.

FIGS. 11A and 11B are each a flowchart showing a frame reassembling process in the frame receiver 12. FIG. 12 is a flowchart showing a frame reassembling process.

Based on the flowchart showing FIG. 12, a description is given of the frame reassembling processing. Firstly, the frame reassembling unit 24 determines whether the frame length of a received transfer frame is less than FL/2 or not (S30).

As the transfer frame is received, the frame reassembling unit 24 first verifies the frame length of the transfer frame. If the frame length thereof is less than or equal to FL/2 (Yes of S30), the frame reassembling unit 24 will determine that no reproduction header is appended. In this case, no frame reassembling processing needs to be carried out and therefore the transfer header is directly outputted.

If the frame length is greater than FL/2 (No of S30), the frame reassembling unit 24 will determine that a reproduction header is appended and then verify the first bit of the first byte of the reproduction header (i.e., fragment FLAG[3]). If fragment FLAG[3] is "0" (No of S32), the frame reassembling unit 24 will determine that the transfer frame is not fragmented and then remove the reproduction header (first reproduction header) appended thereto (S36).

If fragment FLAG[3] is "1" (Yes of S32), the frame reassembling unit 24 will determine that the transfer frame is a fragmented frame and then carry out the frame reassembling processing using the information such as the ID assigned to the reproduction header appended to the transfer frame and a fragment sequence number (S34).

The purpose of using two different reproduction headers, which are the first reproduction header (1 byte) and the second reproduction header (4 bytes), is as follows. That is, the purpose thereof is to reliably distinguish between the case where the transfer frame is a fragmented frame and the case where it is not fragmented. If the first reproduction header is not used but whether or not the transfer frame is a fragment frame is to be determined solely based on the frame length of the transfer frame, there may be cases where the distinction cannot be made therebetween. Suppose, for example, that the fragmentation reference frame length FL is set to 1000 bytes and a 600-byte transfer frame is received by the frame reassembling unit 24. In this example, the frame reassembling unit 24 cannot make a distinction, as to whether or not the 600-bytes transfer frame is fragmented, by solely verifying the length of the transfer frame. At the same time, appending the 4-byte second reproduction header to the 600-byte transfer frame which is not fragmented is not desirable from a viewpoint of the rate of bandwidth increase. Thus, as with the present embodiment, the first reproduction header, which is shorter than the second reproduction header, is appended to the 600-byte transfer frame that is not fragmented, whereas the second reproduction header is appended to the 600-byte transfer frames that are fragmented. As a result, while the distinction as to whether or not the transfer frame is fragmented is reliably made, the rate of bandwidth increase can be suppressed.

FIG. 13 shows a list of conditions under which a frame/frames is/are discarded in the frame reassembling process. The frame is discarded when the reassembling process cannot be completed. If no frames is discarded, frames that fail to be reassembled completely will remain unused and unprocessed in a reassembly buffer. Thus properly discarding the frames will improve the rate of bandwidth increase in the reassembly buffer.

Figure 14:
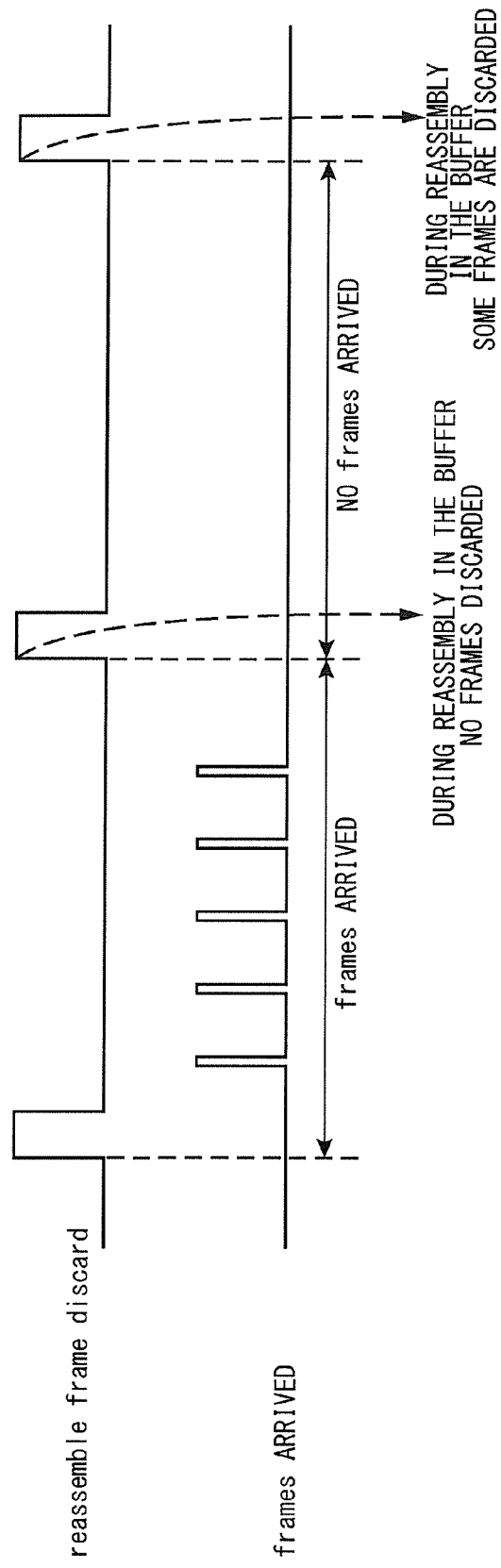
FIG. 14 is a diagram for explaining an operation in a reassembly buffer clearing process shown in the item 5 of FIG. 13.

FIG. 14 is a diagram for explaining an operation in the reassembly buffer clearing process shown in the item 5 of FIG. 13. An operation performed to clear the assembly buffer (hereinafter referred to as "reassembly buffer clearing process" also) is required to effectively use the reassembly buffer. A trigger pulse used to trigger the clearing of the reassembly buffer is generated by hardware independently or is given from software at regular intervals (see "reassemble-frame-discard pulses in FIG. 14). If this reassemble-framediscard pulse is used as a trigger and if not a single frame has arrived during a period of time from the occurrence of the previous pulse leading up to the present, the frame(s) will be discarded. This corresponds to the operation performed during a period of time marked with "no frames arrived" depicted in FIG. 14. If, on the contrary, a single frame or more has arrived, the frame(s) will not be discarded (see the operation performed during a period of time marked with "frames arrived" in FIG. 14).

Figure 15:
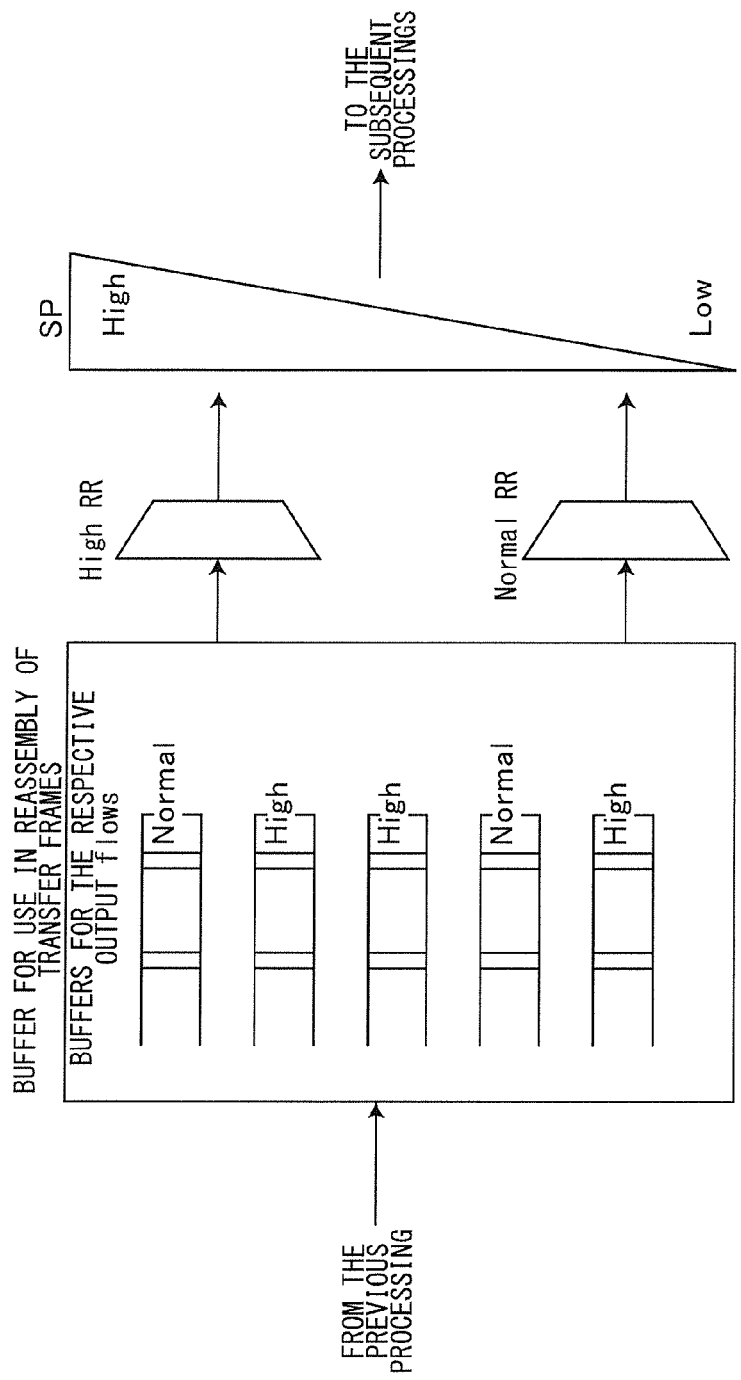
FIG. 15 shows a structure of a buffer for use in reassembly.

FIG. 15 shows a structure of a buffer for use in reassembly. Since, for example, there are various waiting times occurring among frames in a system, the time intervals between which the transfer frames arrive at the frame receiver 12 are not equal. Thus, the transfer frames need to wait in the reassembly buffer before the reassembling processing has been completed. Accordingly, the buffer for use in reassembly is configured such that frames having a maximum frame length can be buffered therein. As shown in FIG. 15, the transfer frames, which have been transmitted from the previous processing, are accumulated and saved in their respective buffers provided for the respective output flows. Each of the respective buffers for the respective output flows is configured such that an output priority can be set after the reassembly has been completed. In this example, the output priority is set to two levels, which are a "high" priority and a "normal" priority but a plurality of priority levels more than two levels may also be set.

FIG. 16 is a diagram for explaining problems caused when no output priority is given after reassembly. Generally, a processor or the like capable of processing a large volume of frames is not configured in a manner that permits processing a plurality of processes in parallel. Instead, the processor or the like is generally so configured as to accelerate the processing and process a plurality of tasks serially. If the processor is not configured such that a plurality of processes is processed serially, a predetermined number of external memories will be required to realize a predetermined number of tasks in parallel when the processor interfaces with the external memories or the like. And this is not possibly practically and this is why the processor or the like is generally so configured as to process a plurality of tasks serially.

In FIG. 16, a description is given using a structure where a buffer is provided for each port. And through those buffers, frames, which are processed from right to left in a serial manner of 10 Gbps, undergo the reassembly processing by the use of the buffers provided for the respective ports, and then the frames are restored in a serial manner of 10 Gbps. In this case, if frames are in a status where the reassembly processing has been completed at Port #0 and are thus ready to be outputted but if simultaneously the reassembly processings of the output frames also have been completed at the maximum value (9600 bytes in this example) at Port #1 to Port #9, the frames at Port #1 to Port #9 will have to wait until Port #0 takes its turn while the reassembled frames are read out using a round-robin (RR) method. In other words, one has to wait for a time duration required to complete the read-out of the total of 9 ports each corresponding to 9600 bytes. Hence, one must wait for about 70 us after the completion of the frame reassembly in the case of 10 Gbps. This means that even though there are frames that are to be outputted preferentially, the delay time will be long and therefore this does not achieve the purpose of the present invention, namely the purpose of reducing the variation in transmission delay. Hence, it is desirable that the frame transmission system be configured as follows. That is, the priority level is set for each buffer. And if both the reassembly processing of frames having a high priority and the reassembly processing of those having a lower priority have been completed simultaneously, those having a higher priority will be outputted first.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

What is claimed is:

1. A frame transmission system comprising:
a frame transmitter adapted to:
fragment an input frame so as to output transfer frames when a length of the input frame exceeds a predetermined fragmentation reference frame length, and not fragment the input frame so as to output the input frame as a transfer frame when the length of the input frame is less than or equal to the fragmentation reference frame length; and
append a reproduction header to the output transfer frame, the reproduction header being required when the transfer frames are reproduced at a receiving side; and
a frame receiver adapted to reproduce the input frame from the transfer frames received from the frame transmitter,
wherein the frame transmitter is adapted to vary a header length of the reproduction header to be appended to the transfer frame, according to the length of the input frame,
wherein, when the length of the input frame is less than or equal to ½ of the fragmentation reference frame length, the frame transmitter is adapted to not append the reproduction header to the transfer frames,
when the length of the input frame is greater than ½ of the fragmentation reference frame length and less than or equal to the fragmentation reference frame length, the frame transmitter is adapted to append a first reproduction header having a first predetermined header length to the transfer frames, and
when the length of the input frame is greater than the fragmentation reference frame length, the frame transmitter is adapted to append a second reproduction header having a second predetermined header length, which is longer than the first predetermined header length, to the transfer frames.

2. The frame transmission system according to claim 1, wherein, when the length of the input frame is greater than the fragmentation reference frame length, the frame transmitter is adapted to fragment the input frame in a manner such that the length of the transfer frame becomes greater than ½ of the fragmentation reference frame length.

3. The frame transmission system according to claim 1, wherein the frame receiver is adapted to identify whether or not the reproduction header is appended to the transfer frame, based on the frame length of the transfer frame received.

4. The frame transmission system according to claim 3, wherein the first reproduction header contains information indicating that the transfer frame is not a fragmented frame, and the second reproduction header contains information indicating that the transfer frame is a fragmented frame.

5. The frame transmission system according to claim 4, wherein the frame receiver is adapted to identify that the reproduction header is the first reproduction header or the second reproduction header, based on the information, contained in the reproduction header appended to the received transfer frame, indicating whether the transfer frame is a fragmented frame or not.

6. The frame transmission system according to claim 4, wherein the second reproduction header further contains a frame identification number and a frame sequence number.

7. The frame transmission system according to claim 1, wherein, when the transfer frames are not completely reproduced, the frame receiver is adapted to discard said transfer frames.

8. The frame transmission system according to claim 1, wherein the frame receiver includes a buffer used for a frame reassembling process, and the buffer is configured to set an output priority after the frame reassembling process has been completed.

* * * * *